United States Patent
De Gaetano et al.

(10) Patent No.: US 9,065,825 B2
(45) Date of Patent: Jun. 23, 2015

(54) METHOD AND SYSTEM FOR LICENSE MANAGEMENT

(75) Inventors: Rossella De Gaetano, Rome (IT); Artur Obrzut, Kraków (PL); Ryszard Olkusnik, Kraków (PL); Rafal Sontowski, Zielonki (PL)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 12/940,472

(22) Filed: Nov. 5, 2010

(65) Prior Publication Data

US 2011/0197062 A1 Aug. 11, 2011

(30) Foreign Application Priority Data

Feb. 5, 2010 (EP) ..................................... 10152799

(51) Int. Cl.
  *H04L 29/06* (2006.01)
(52) U.S. Cl.
  CPC ............ *H04L 63/10* (2013.01); *H04L 63/0823* (2013.01)
(58) Field of Classification Search
  CPC .............................. H04L 63/10; H04L 63/0823
  USPC ...................................................... 726/26–31
  See application file for complete search history.

(56) References Cited

U.S. PATENT DOCUMENTS

| | | | | |
|---|---|---|---|---|
| 5,390,297 A | * | 2/1995 | Barber et al. ................... | 726/29 |
| 5,758,069 A | * | 5/1998 | Olsen ............................... | 726/27 |
| 7,765,600 B2 | * | 7/2010 | Saunders et al. ................ | 726/27 |
| 8,789,209 B2 | * | 7/2014 | Yoakum et al. ................. | 726/29 |
| 2004/0010471 A1 | * | 1/2004 | Lenard et al. .................... | 705/59 |
| 2007/0011724 A1 | * | 1/2007 | Gonzalez et al. ................ | 726/4 |
| 2007/0118911 A1 | * | 5/2007 | De Gaetano ..................... | 726/30 |
| 2007/0255813 A1 | | 11/2007 | Hoover et al. | |
| 2008/0177560 A1 | | 7/2008 | Niinomi | |
| 2009/0144437 A1 | * | 6/2009 | Fishman et al. ............. | 709/229 |
| 2011/0047624 A1 | * | 2/2011 | Vedantam et al. ............. | 726/26 |

OTHER PUBLICATIONS

"Virtualization New Trend, New Complexities", Datasheet; Acresso Software Inc. May 2009.

* cited by examiner

*Primary Examiner* — Chau Le
(74) *Attorney, Agent, or Firm* — Mollborn Patents, Inc.; Fredrik Mollborn

(57) ABSTRACT

Embodiments of the invention relate to methods, apparatus and systems, including computer program products for license management in one or more computer systems. A first computer runs a master license server process instance. The master license service process instance is associated with a hardware identifier relates to the first computer and has a license to run a predefined number of concurrent production license server process instances that are responsible for license management towards clients. A request is received by the master license server process instance for a license from a production license server process instance in a second computer. The master license server process instance provides a virtual identifier to the production license server process instance to be used as a unique identifier for license management purposes towards clients by the production license server process instance. The virtual identifier is cryptographically secured against modification.

18 Claims, 5 Drawing Sheets

METHOD AND SYSTEM FOR LICENSE MANAGEMENT

CROSS-REFERENCE TO RELATED APPLICATIONS

This application claims priority to European Application No. 10152799.2, which was filed on Feb. 5, 2010, and entitled "Method and System for License Management."

BACKGROUND OF THE INVENTION

The various embodiments described herein relate to license management. Currently license servers use hardware related identifiers to prevent overuse of licenses. Identifiers generated by the hardware are employed to prevent the customer from enrolling the same license on more than one license server.

One limit of this approach is that a safe license management system cannot rely on a server running on a virtual machine because in such environment many servers can be started on one physical box with the same hardware identifier. All the virtual unique identifiers are due to their definition not permanent, so they cannot be used to extend in a reliable way the concept of a unique hardware identifier. Known license management solutions prevent the license server from starting on virtual platforms or rely on using additional hardware such as so called smart cards or secure cards to provide secure identifiers. The first solution is not acceptable in the current virtualized world. The second solution is expensive and uncomfortable.

Another limit is that backing up the license server requires buying twice the same license certificates for two (or more) different servers or relying on high availability solutions as described below. This kind of solution requires additional hardware and licenses which is an expensive cost factor and necessitates additional administration effort as the license administrator needs to administer and monitor more servers.

Another limit is that scalability and high availability are limited by complex algorithms that will allow sharing the same license certificate among more than one license server because of being a clustering technique for license server clusters, but with strict checks on the scalability itself. In current solutions it is not possible to scale to more than 12 license servers, and reaching such configuration is dependent on the initial size of the solution. This kind of solution foresees a perfect planning before setting up the license server cluster. An expansion which is faster than scheduled will require additional hardware and a new set of licenses, as the license certificates are tied to the cluster identifier. Because of this relation between certificates and cluster identifier, the cluster cannot scale indefinitely due to possible security breaches.

In U.S. Patent Application Publication No. 20080177560, an identifier (ID) lending system is disclosed which uses an ID management table having a correlation between an ID and a request source which specifies a source of a lending request of the ID. The ID management table includes entries such as an IP address, ID, timeout time, hardware ID characteristic of a licensing server at an ID-lending destination, e.g. a MAC address, and a final verification time. The IP address in the license management table refers to an IP address of a licensing server targeted for ID-lending, and the ID is an ID to be lent to the licensing server. The ID lending system lends differing IDs. An ID lending unit searches the ID management table for a request source upon receiving a lending request of an ID from the request source, replying with an ID to the request source wherein the ID corresponds to the request source. An ID lending continuation verification unit receives a lending continuation request for the ID from the request source to which the ID lending unit replied with the ID.

When a predetermined time period has not elapsed since the lending continuation request was received, the ID lending unit does not reply even when the lending request is received from the request source to which the ID lending unit replied. If an ID-lending continuation request for an ID is not received in the predetermined timeout time period, e.g. several minutes, from an ID lending destination (on an ID borrowing side) then the ID lending unit permits lending of the ID to another licensing server.

SUMMARY

In one aspect, methods, apparatus and systems, including computer program products, are provided for license management in one or more computer systems. In one embodiment, a first computer runs a master license server process instance. The master license service process instance is associated with a hardware identifier that relates to the first computer and has a license to run a predefined number of concurrent production license server process instances that are responsible for license management towards clients. A request is received by the master license server process instance for a license from a production license server process instance in a second computer. The master license server process instance provides a virtual identifier to the production license server process instance to be used as a unique identifier for license management purposes towards clients by the production license server process instance. The virtual identifier is cryptographically secured against modification.

In another aspect, methods, apparatus and systems, including computer program products, are provided for license management in one or more computer systems. In one embodiment, a production license server process instance in a second computer requests a license from a master license server process instance running on a first computer. The production license server process instance receives from the master license server process instance a virtual identifier. The virtual identifier is cryptographically secured against modification. The production license server process instance uses the virtual identifier as its unique identifier and for license management purposes towards clients.

DESCRIPTION OF THE DRAWINGS

The various embodiments may best be understood from the following detailed description, wherein is shown schematically in.

Figure 1:
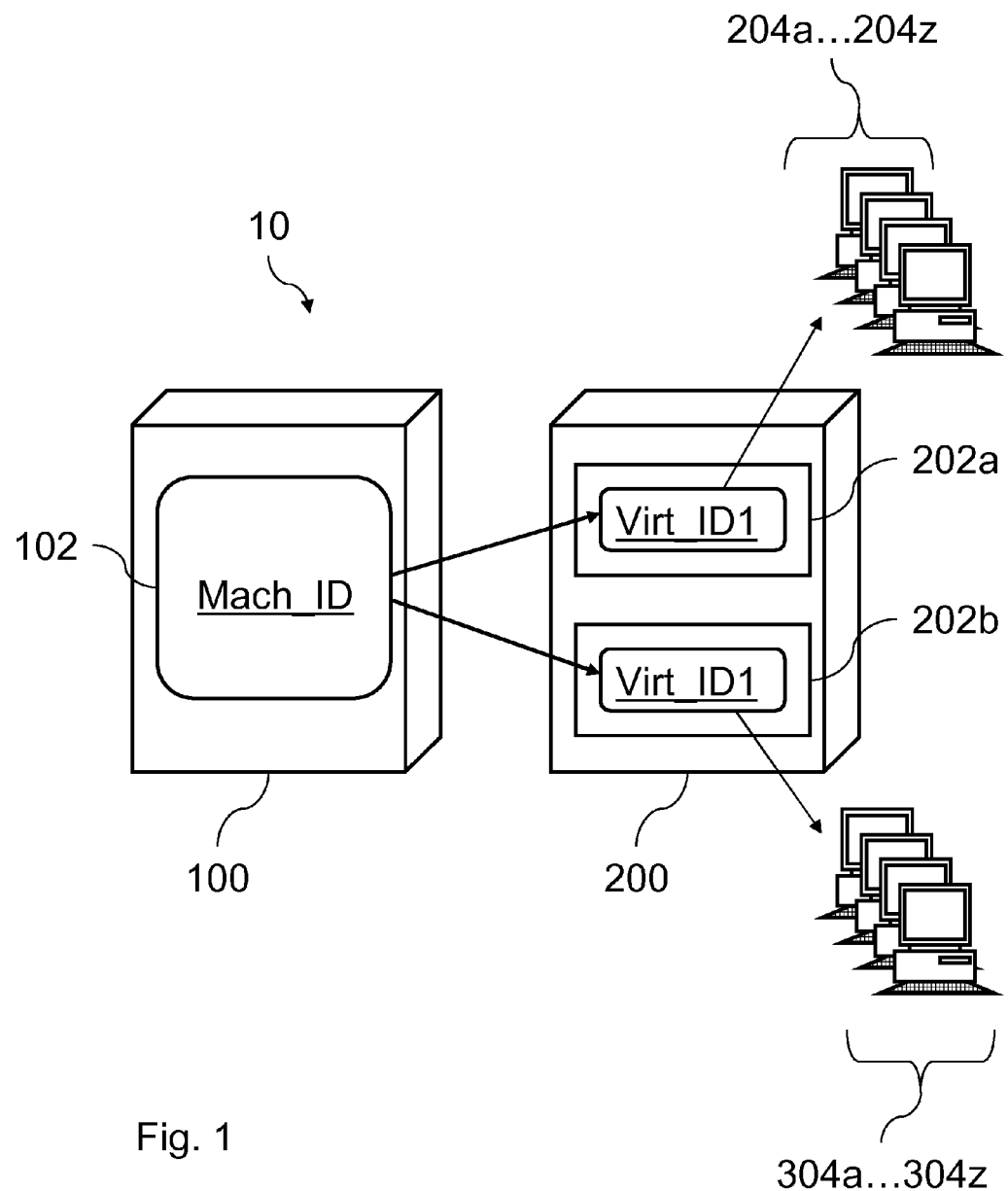
FIG. 1 a simple user scenario in accordance with one embodiment for a production license server process instance running on a virtual platform on a second computer receiving a master license from a master license server process instance on a first computer.

In the drawings, like elements are referred to with equal reference numerals. The drawings are merely schematic representations, not intended to portray specific parameters of the various embodiments. Moreover, the drawings are intended to depict only typical embodiments and therefore should not be considered as limiting the scope of the various aspects of the invention.

DETAILED DESCRIPTION

The various embodiments described herein relate to methods, apparatus and systems, including computer program products for license management in one or more computer systems. The various embodiments will be described by way of example and should not be construed as limiting the scope of the appended claims. As the skilled person realizes, many variations of the embodiments described herein will fall within the scope of the appended claims.

In one embodiment, a first computer runs a master license server process instance. The master license service process instance is associated with a hardware identifier that relates to the first computer and has a license to run a predefined number of concurrent production license server process instances that are responsible for license management towards clients. A request is received by the master license server process instance for a license from a production license server process instance in a second computer. The master license server process instance provides a virtual identifier to the production license server process instance to be used as a unique identifier for license management purposes towards clients by the production license server process instance. The virtual identifier is cryptographically secured against modification.

In one embodiment, only a master license that gets enrolled in a master license server process instance is tied to the unique hardware identifier of the host (i.e. the first computer) where the master license server process instance is running The virtual identifier is already contained in the master license. The master license server sends the virtual identifier to the production server on request. Then the customer orders licenses with that virtual identifier as a "unique" identifier and enrolls the licenses on the production license server process instance. The license management method provides the possibility to lend the same identification to clients, while it can ensure that no more than N production license server process instances will run at the same time, where N is the number allowed in the master license certificate. The client, in this case is a production license server itself, only cares about the license.

An alternative, permanent identifier for a production license server can be provided which can be used instead of a physical hardware-tied identifier generated by the hardware of the master license server process instance (master license server). The identifier can be available as a special tag in a license certificate. The license certificate including the special tag can be referred to as a master license. The master license is stored on the first computer on which the master license server process instance is running, i.e. it is stored on a non-virtual platform, identified by a conventional physical hardware identifier, i.e. a hardware identifier such as a Media Access Control (MAC) address or the like. In this case, the production license server process instance running on a virtual platform in the second computer can be treated as a license client. The production license server process instance is considered a license client for the master license server process instance, i.e. it will perform the same activities than a "regular" client from a licensing point of view, a difference being that instead of asking for a license to run a software it will ask a license to run itself as a secure license server.

One embodiment provides a reliable, permanent, unique identifier for a licensing management system in a virtual environment. It is possible to have a secure licensing management system in an environment with virtual platforms on a computer, although in a virtual environment more than one system will share the same hardware. Sharing the same hardware normally makes it easy to enroll one set of licenses on multiple virtual machines on the same hardware thus multiplying the number of licenses which the customer was originally entitled to. In one embodiment, this is prevented by having two hierarchical layers: the master license process server instance associated with the master license and the production license process server instance which requests the master license and receives a virtual identifier which is used in a license certificate of the production license server process instance. The license certificate is not tied to the hardware identifier of the master license process server instance but to the virtual identifier of the production license process server instance. Clients (i.e. enabled applications) served by the production license process server instance cannot request the license. Such a license request would return a virtual identifier the client has no way and no need to deal with.

According to one embodiment, a customer (i.e. client) cannot overcome a license entitlement. New production license server processes can be started as needed, as long as the master license server process instance is not exceeding a number of concurrent production license servers it is allowed to run and/or to supervise. However, a manufacturer of the licensing systems can implement specific policies to overcome a license entitlement, by way of example by proposing a periodic reconciliation: the manufacturer may, for example, periodically ask the customer for reports, check the difference between licenses purchased and used and in case invite the customer for buying more licenses.

The master license server process instance can be small as in the simplest case it only has to manage a single license, i.e the master license. By way of example, the master license server in a simple case may have the capacity a mobile phone.

The production license server process instance running on a virtual platform can obtain its identifier by requesting the license certificate from the master license server on which the master license has been enrolled. In other words, the production license server process itself becomes a license enabled application.

In one embodiment, the license of the master license server process instance may include a predefined number of concurrent production license server process instances that are entitled to be started using the virtual identifier. New production license server processes can be started as needed, as long as the master license server is not exceeding the number of concurrent production license servers it is allowed to run and/or to supervise.

In one embodiment, each production license server process instance may use the same virtual identifier as its identifier for its clients. This makes it possible to have at least the same level of security and reliability of traditional license management systems also in a virtualized environment because of the unique identifier for the production license server process instances. It is not possible to copy the same license certificate on several systems. However, for backup it is possible to clone the license management system. According to one embodiment it is possible to run more than one production license server process instance with the same (virtual) identifier. The master license server process instance assures that one cannot run more instances of a production license server than entitled, unless special policies as reconciliation are implemented.

In one embodiment, the license certificate having the virtual identifier as additional tag is stored on the first computer running on a non-virtual platform. The virtual identifier provided by the master license server process instance may be a tag in the master license. Expediently, the virtual identifier is an integral element of the master license certificate. The virtual identifier is replacing the unique identifier in the license certificate for the production license server process instance, and by definition is no longer unique.

In one embodiment, the license certificate having the virtual identifier may be stored on the first computer running on a non-virtual platform. In a simple case, the first computer needs only to handle a single license associated with the master license server process instance.

In one embodiment, the production license server process instance running on the second computer may be running on a virtual or a physical platform. Particularly on a virtual platform the license entitlement cannot be exceeded.

In one embodiment, the production license server process instance may use the virtual identifier as own identifier, making the license certificate unique. According to the number of allowed production license server processes associated with the master license as many concurrent production license server processes can be started as indicated by the number but only as many as indicated by the number.

In one embodiment, the license on the first computer may be released on permanent stop of the second computer. Expediently, in a situation in which one of two or more production license server process instances is either shut down, crashed or whatever that takes the process down, the regular license check (also known in the art as "heartbeat") fails as no instance is telling anymore the master license server process instance that this particular license is in use. As a result the license is released by the master license server process instance after a defined timeout expired. In case the production license server process instance is shut down by purpose when not needed anymore, the shut down procedure will take care of notifying the master license server process instance that the license certificate of the particular production license server process instance is no longer in use.

In both cases, after the license gets released, it is returned to the pool of available and requestable licenses so that another production license server process instance can request it.

In one embodiment, for backup of the second computer the first computer may be connected to a backup computer replacing the second computer.

Generally, the various embodiments allow for a reliable, permanent and unique identifier for a license management system which can run not only on physical but particularly also on virtual platforms.

Up to now known licensing systems use hardware identifiers to avoid the possibility of cloning license certificates, i.e. a certificate for a number of licenses is purchased and enrolled in two different license servers thus duplicating the license entitlement. Such duplication is inhibited by the various embodiments described herein. The licenses enrolled on the master license server are secured because they rely on a unique hardware identifier. Because of this the master license server process instance needs to run on a physical, hardware platform and not on a virtual platform.

Turning now to the drawings, FIG. 1 illustrates a simple user scenario of a method for license management in a computer system 10 according to one embodiment of the invention. By way of example the computer system 10 includes a first computer 100 and a second computer 200.

Two production license server process instances 202a, 202b run on a virtual platform of the second computer 200, which receive a master license from a master license server process instance 102 on the first computer 100.

In principle, there can be more than one master license server process instance 102. By way of example, a master license server process instance can serve tens of thousands of clients, so according to various embodiments of this invention, the biggest existing licensing server infrastructures could be covered by only two master license server process instances just for high availability reasons, given the fact that the real scalability is achieved using an appropriate number of production license server process instances.

The master license server process instance 102 is associated with a hardware identifier Mach_ID relating to the first computer 100. The hardware identifier is tied to the first computer 100 e.g. by the MAC address of the first computer 100. The master license server process instance has a license (called master license) to run a predefined number of concurrent production license server process instances 202a, 202b that are responsible for license management towards clients 204a-204b (served by production license server process instances 202a) and 304a-304z (served by production license server process instances 202b).

Each concurrent production license server process instance 202a, 202b of the second computer 200 has a license certificate created for the production license server process instances 202a, 202b by the master license server process instance 102. The license certificate has a virtual identifier Virt_ID which the production license server process instances 202a, 202b are using as own identifiers and for license management purposes towards clients 204a-204z and 304a-304z.

Figure 2:
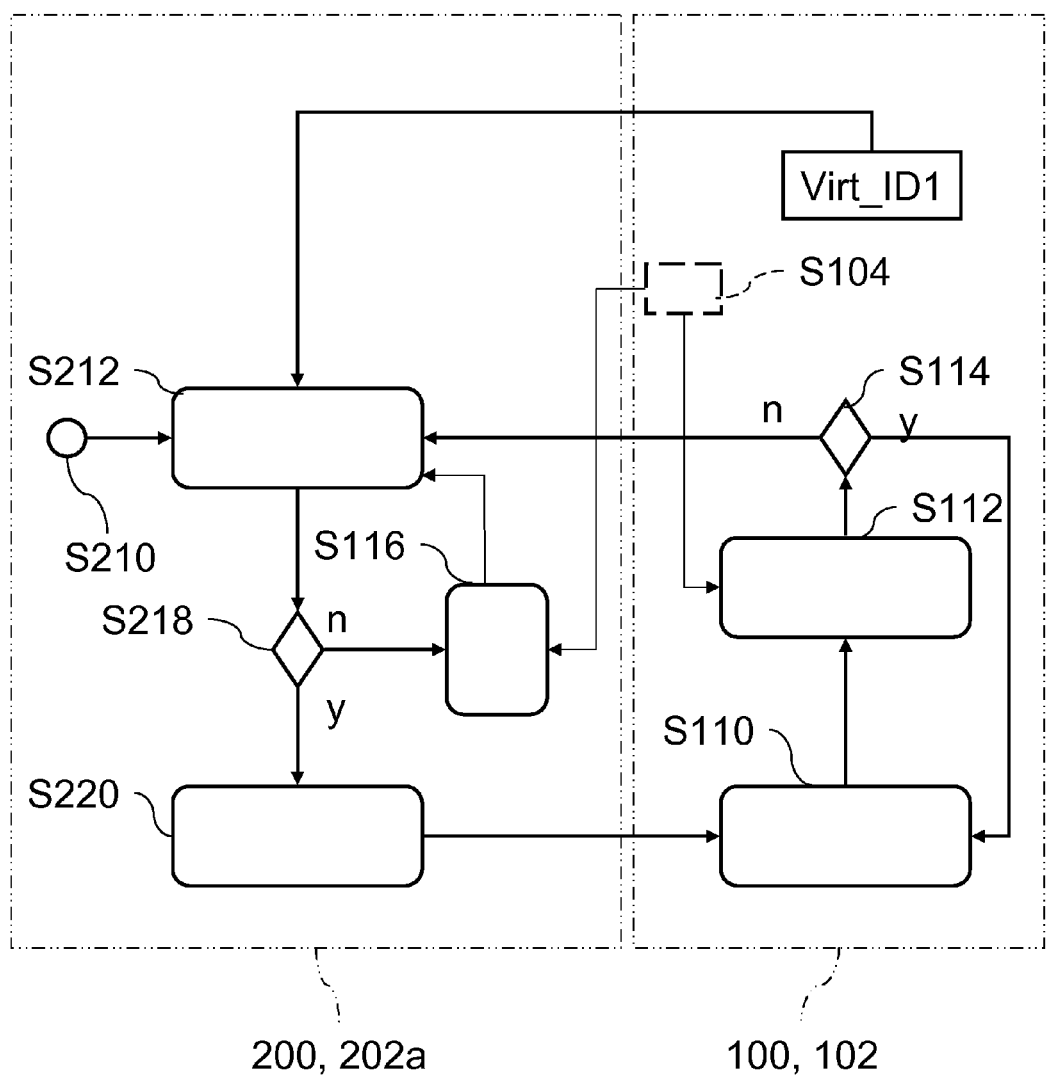
FIG. 2 a block diagram illustrating an implementation of a license request from a production license server process instance to a master license server process instance, in accordance with one embodiment.

FIG. 2 illustrates a license request from the production license server process instance 202a described in FIG. 1 running on the second computer 200 to the master license server process instance 102 on the first computer 100. The request is sent to the first computer 100 hosting the master license server process instance 102 when the production license server process instance 202a starts at step S210. In step S212 the master license server process instance 102 is contacted and a request for a license certificate with a virtual identifier Virt_ID1 (FIG. 1) is sent.

If the request is successful, i.e. the number in the master license of allowed concurrent production license server processes is not exceeded, the production license server process instance 202a receives the license certificate with the virtual identifier Virt_ID 1.

In step S218 it is checked whether the request was successful. If the request was successful ("y" in the block diagram) the virtual identifier Virt_ID1 can be used for identification of the production license server process instance 202a in step S220. Step S220 provides the identifier of the production license server process instance 202a to the master license server process instance 102 in step S110 where licenses are provided for the virtual identifier during a short period of time. When the production license server process instance requests the license from the master license server process instance in step s212, it also communicates a frequency of how often it will send messages that the license is used by the production license server process instance 202a. For example, once the license with the virtual identifier Virt_ID1 is provided to the production license server process instance 202a, the production license server process instance 202a communicates that e.g. every five minutes a message will be sent to the master license server process instance that the license is in use. An implicit implication of this message is that if such a message is not sent after the expected time, the production license server process instance 202a is not in use anymore the license can be made available again for another production license server process instance requesting a license.

If the request was not successful ("n" in the block diagram), it is confirmed that the master license server process instance 102 cannot provide the requested license certificate for the production license server process instance 202a in step S216. The process goes back to step S212 for trying a request again later. This ensures that the number in the master license of allowed concurrent production license server processes is not exceeded.

In step S104 the defined check period ("heartbeat period") is checked to get information about which license is in use or not. If the period has expired, the production license server process instance 202a again sends a request for a license certificate to the master license server process instance 102. The short check period can be used in order to avoid license duplication, by way of example in a case the production license server process instance 202a received the license certificate, then were disconnected from the master license server process instance 102 and the license certificate on the master license server process instance 102 would be available for another production license server process instance. The master license can be released at stop of the production license server process instance 202a.

In the master license server process instance 102 hosted by the first computer 100, in step S110 the virtual identifier Virt_ID1 is received, wherein a license certificate is provided for the production license server process instance 202a identified with the virtual identifier Virt_ID1 which is provided for the check period. In step S112 it is periodically checked (the time period is controlled in step S104) whether the provided license with the virtual identifier Virt_ID1 is valid. The periodic check is needed to keep the license in use on the master license server and so also to avoid license duplication. In step S114 it is checked whether this was successful. If the check was successful (valid license certificate, "y" in the block diagram), the process goes back to step S110. If the check of the license usage is successful, the production license server process instance 202a can keep using the virtual identifier Virt_ID1 it got at request time, i.e. it is not necessary to send the virtual identifier Virt_ID1 again). If the check was not successful ("n" in the block diagram), the production license server process instance 202a hosted by the second computer 200 receives a refusal of the license request in step S112.

All license certificates that will need to be enrolled on the second computer to be requested by the enabled applications identifier Virt_ID1 instead of a hardware identifier, and all production license server processes instances will use the same virtual identifier Virt_ID1.

The production license server process instances can use conventional periodic checks to ensure that the master license will be kept in use on the master license server process instance 102.

Figure 3:
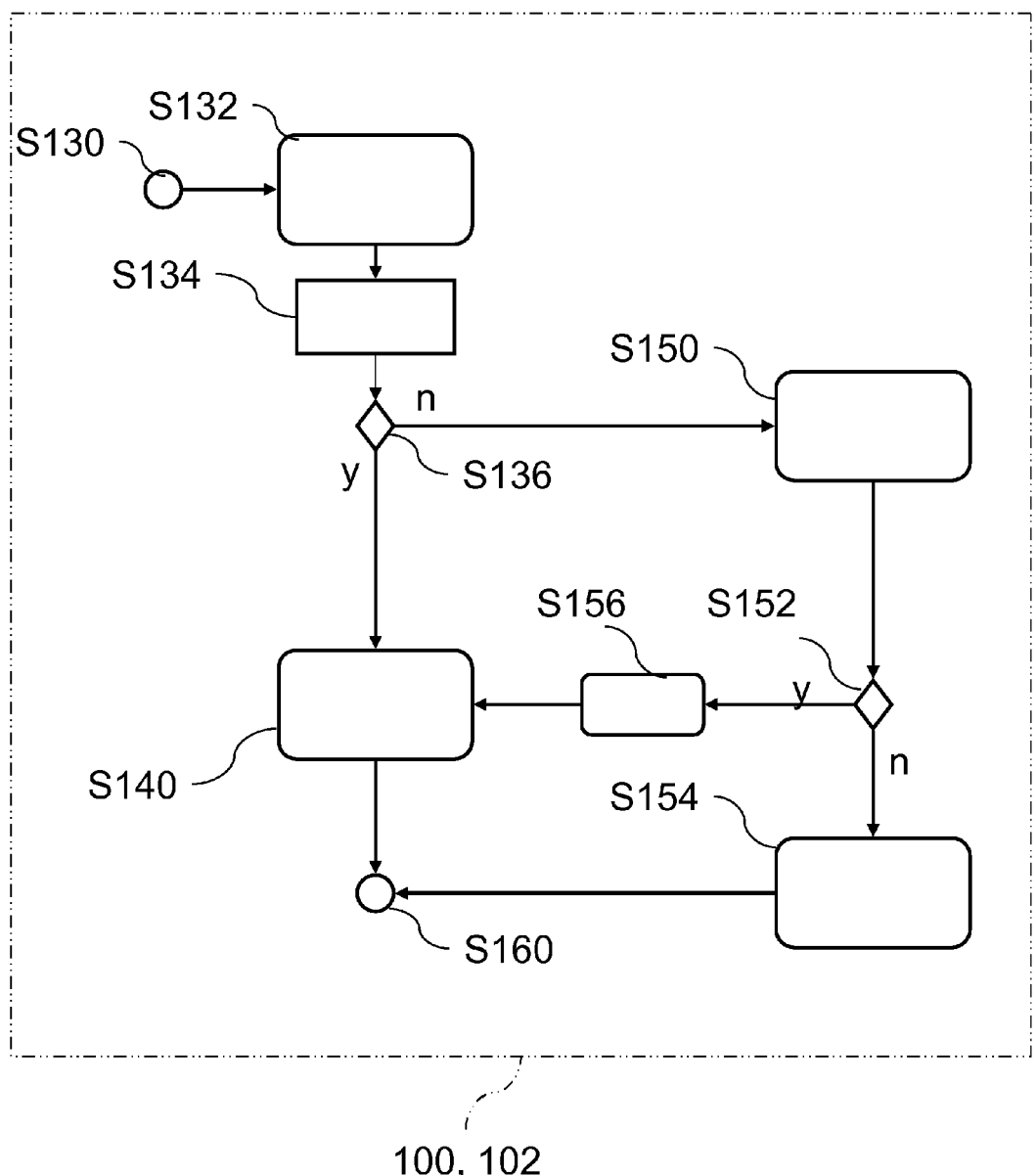
FIG. 3 a block diagram illustrating a license request handling in the master license server process instance of FIG. 2, in accordance with one embodiment.

FIG. 3 illustrates a block diagram illustrating a license request handling in the master license server process instance of FIG. 2.

On start of the request to the master license server process instance 102 on the first computer 100 in step S130, the request of the production license server process instance 202a on the virtual platform of the second computer 200 is received in step S132. In step S134 it is checked whether the license certificate is available by reading a license database including the number of allowed concurrent production license server process instances for the master license.

In step S136 it is checked whether the requested license certificate is available. If the requested license certificate is available ("y" in the diagram), in step S140 the license certificate is put in use, the license database is updated and an approval by getting the virtual identifier Virt_ID1 is sent to the requesting production license server process instance 202a and the process ends in step S160.

If the requested license certificate is not available ("n" in the diagram), in step S150 all license certificates with the same virtual identifier Vir_ID1 are checked in the sense that the master license server process instance 102 reviews through all the licenses in use with the virtual identifier Virt_ID1 to see if there is anyone that is expired (i.e. the heartbeat check failed) to release it and make it available. In step S152 it is checked whether or not there are expired licenses (with the heartbeat expired).

If there are no licenses for which the heartbeat expired ("n" in the diagram), in step S154 a refusal is sent to the requesting production license server process instance 202a, the process ends in step S160.

If there are licenses for which the heartbeat expired ("y" in the diagram), the available license certificates are released in step S156 and in subsequent step S140 the license certificate is put in use, the license database is updated and an approval is sent to the requesting production license server process instance 202a and the process ends in step S160. The production license server process instance 202a itself is handled like a client by the master license server process instance 102.

Figure 4A:
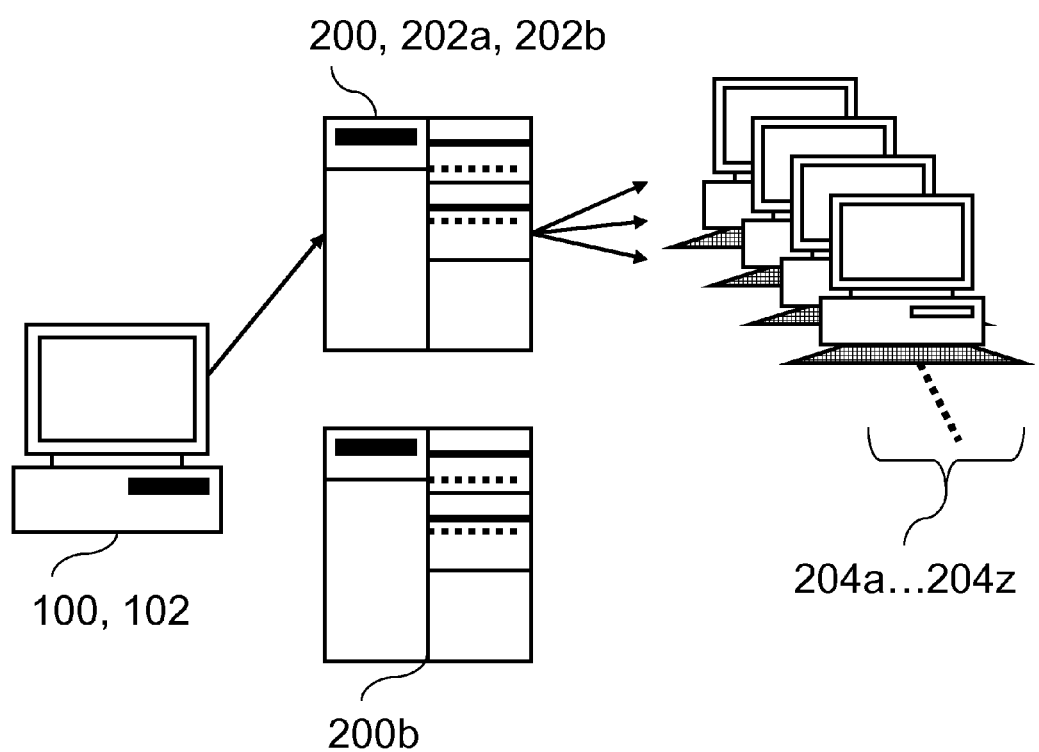
FIG. 4a, 4b a sketch of a backup in a license management system, in accordance with one embodiment, with clients connected to a production license server process instance (FIG. 4a) and clients connected to a backup production license server process instance (FIG. 4b).
Figure 4B:
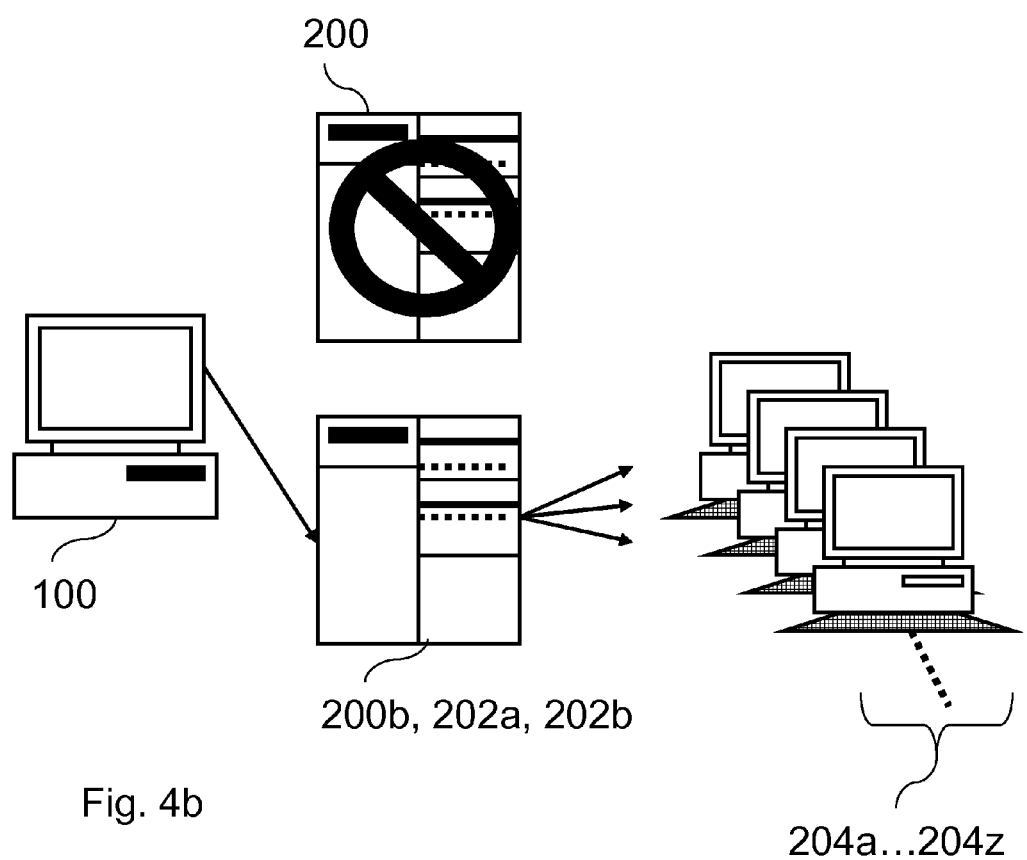

FIGS. 4a and 4b illustrate how a backup in a license management system can be performed according to one embodiment of the invention.

In FIG. 4a a first computer 100 hosts a master license server process instance 102. As the master license server process instance 102 only requires marginal resources—in the easiest case it manages only one single master license, the first computer 100 can have a small computer capacity.

The master license server process instance 102 is associated with a second computer 200 hosting one or more production license server process instances 202a, 202b which serve clients 204a-204z.

In case of a failure of the second computer 200, a backup is easily achieved as illustrated in FIG. 4b. A backup computer 200b replaces the broken second computer 200. Now the backup computer 200b sends the license requests to the master license server process instance 102 on the first computer and obtains the same virtual identifier Virt_ID1 as the broken computer 200 before. At that point the customer associated with the second computer 200 and backup computer 200b does not need to reorder all the licenses from the software provider, but only needs to enroll all license certificates on the backup computer 200b.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, embodiments of the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code which must be retrieved from bulk storage during execution.

Input/output or I/O-devices (including, but not limited to keyboards, displays, pointing devices, etc.) can be coupled to the system either directly or through intervening I/O controllers.

Network adapters may also be coupled to the system to enable the data processing system or remote printers or storage devices through intervening private or public networks. Modems, cable modem and Ethernet cards are just a few of the currently available types of network adapters.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A method for license management in one or more computer systems, comprising:
    running a master license server process instance on a first computer running on a non-virtual platform, said master license service process instance being associated with a hardware identifier relating to the first computer and having a license to run a predefined number of concurrent production license server process instances, each production license server process instance being responsible for license management towards clients;
    receiving a request by said master license server process instance for a license from a production license server process instance in a second computer, said production license server process instance running on the second computer on a virtual platform;
    providing by said master license server process instance a license certificate to said production license server process instance in the second computer, said license certificate containing a virtual identifier as a tag in said license certificate, said virtual identifier being used as a non-permanent unique identifier in a license certificate of said production license server process instance in the second computer when serving licenses to clients, said virtual identifier being cryptographically secured against modification; and
    in response to said master license server process instance detecting that said production license server process instance in the second computer is not serving licenses to clients, revoking said license certificate from said production license server process instance in the second computer and providing said license certificate to a different production license server process instance.

2. The method according to claim 1, further comprising:
    using said virtual identifier by said production license server process instance as its unique identifier and for license management purposes towards clients.

3. The method according to claim 1, wherein the license of the master license server process instance includes a predefined number of concurrent production license server process instances that are entitled to be started using the virtual identifier.

4. The method according to claim 1, wherein each production license server instance uses the same virtual identifier as its identifier for its clients.

5. The method according to claim 1, wherein the production license server process instance uses the virtual identifier as own identifier.

6. The method according to claim 1, wherein the license on the first computer is released on stop of the second computer.

7. The method according to claim 1, wherein for backup of the second computer a backup computer is connected to the first computer.

8. The method according to claim 7, wherein the backup computer starts communication with the first computer.

9. A method for license management comprising:
    requesting, by a production license server process instance running on a virtual platform in a second computer, a license from a master license server process instance running on a non-virtual platform on a first computer;
    receiving, by said production license server process instance, from said master license server process instance a license certificate containing a virtual identifier as a tag in said license certificate, said virtual identifier being cryptographically secured against modification;
    using, by said production license server process instance, said virtual identifier as its a non-permanent unique identifier in a license certificate of said production license server process instance when serving licenses to clients; and
    in response to said master license server process instance detecting that said production license server process instance is not serving licenses to clients, revoking said license certificate from said production license server process instance and providing said license certificate to a different production license server process instance.

10. A computer program product for license management in one or more computer systems, the computer program product comprising:
    a non-transitory computer readable storage medium having computer readable program code embodied therewith, the computer readable program code comprising:
    computer readable program code configured to run a master license server process instance on a first computer running on a non-virtual platform, said master license service process instance being associated with a hardware identifier relating to the first computer and having a license to run a predefined number of concurrent production license server process instances, each production license server process instance being responsible for license management towards clients;
    computer readable program code configured to receive a request by said master license server process instance for a license from a production license server process instance in a second computer, said production license server process instance running on the second computer on a virtual platform;

computer readable program code configured to provide by said master license server process instance a license certificate to said production license server process instance in the second computer, said license certificate containing a virtual identifier as a tag in said license certificate, said virtual identifier being used as a non-permanent unique identifier in a license certificate of said production license server process instance in the second computer when serving licenses to clients, said virtual identifier being cryptographically secured against modification; and computer readable program code configured to in response to said master license server process instance detecting that said production license server process instance in the second computer is not serving licenses to clients, revoke said license certificate from said production license server process instance in the second computer and provide said license certificate to a different production license server process instance.

11. The computer program product according to claim 10, further comprising:

computer readable program code configured to use said virtual identifier by said production license server process instance as its unique identifier and for license management purposes towards clients.

12. The computer program product according to claim 10, wherein the license of the master license server process instance includes a predefined number of concurrent production license server process instances that are entitled to be started using the virtual identifier.

13. The computer program product according to claim 10, wherein each production license server instance uses the same virtual identifier as its identifier for its clients.

14. The computer program product according to claim 10, wherein the production license server process instance uses the virtual identifier as own identifier.

15. The computer program product according to claim 10, wherein the license on the first computer is released on stop of the second computer.

16. The computer program product according to claim 10, wherein for backup of the second computer a backup computer is connected to the first computer.

17. The computer program product according to claim 16, wherein the backup computer starts communication with the first computer.

18. A data processing system for license management, said data processing system comprising:

a first computer for running a master license server process instance on a non-virtual platform; and at least one second computer for running at least one production license server process instance on a virtual platform, wherein:

said master license service process instance is associated with a hardware identifier relating to the first computer and has a license to run a predefined number of concurrent production license server process instances, each production license server process instance being responsible for license management towards clients;

said master license server process instance is configured to receive a request for a license from a production license server process instance in the at least one second computer;

said master license server process instance is configured to provide a license certificate containing a virtual identifier to said production license server process instance in the at least one second computer, said virtual identifier being a tag in said license certificate, said virtual identifier being used as a non-permanent unique identifier in a license certificate of said production license server process instance in the at least one second computer when serving licenses to clients, said virtual identifier being cryptographically secured against modification; and said master license server process instance is configured to, in response to detecting that said production license server process instance in the at least one second computer is not serving licenses to clients, revoke said license certificate from said production license server process instance in the at least one second computer and provide said license certificate to a different production license server process instance.

* * * * *